(No Model.) 3 Sheets—Sheet 1.
G. C. PHILLIPS.
COTTON PICKING MACHINE.
No. 530,451. Patented Dec. 4, 1894.
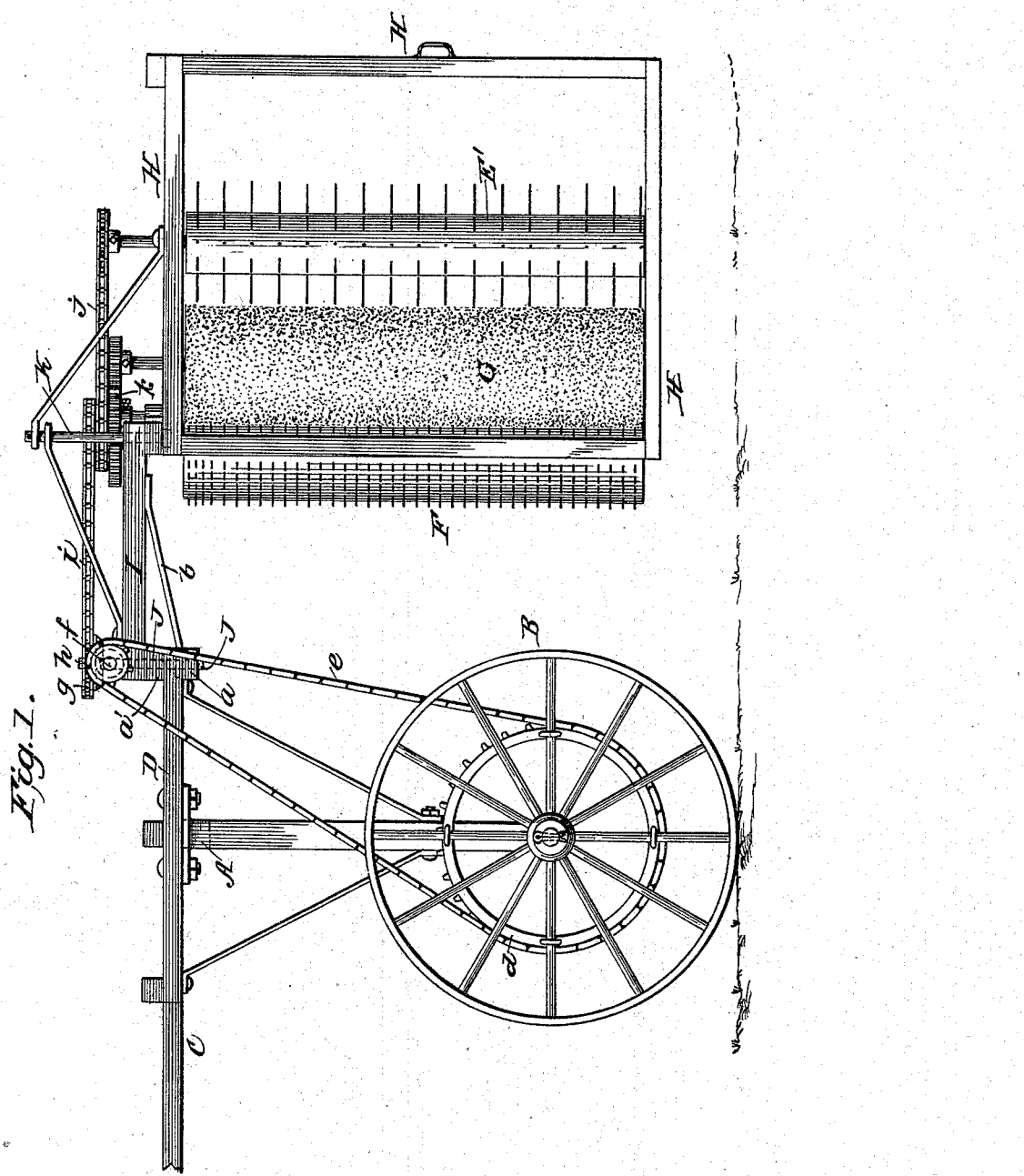
WITNESSES:
Fred G. Dieterich
Amos W. Hart
INVENTOR
George C. Phillips.
BY Munn & Co
ATTORNEYS.

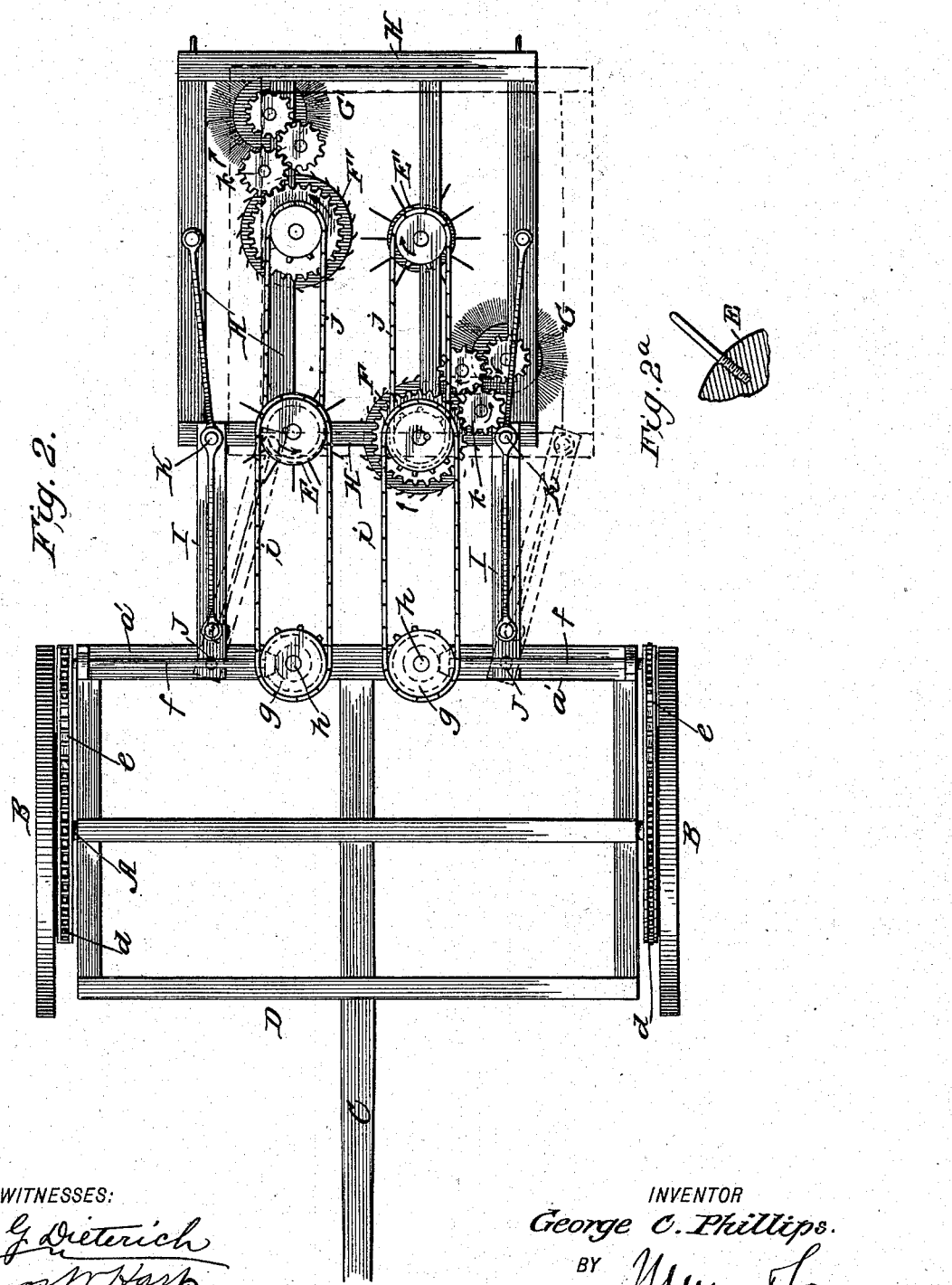

(No Model.)
G. C. PHILLIPS.
COTTON PICKING MACHINE.
No. 530,451.
3 Sheets—Sheet 3.
Patented Dec. 4, 1894.
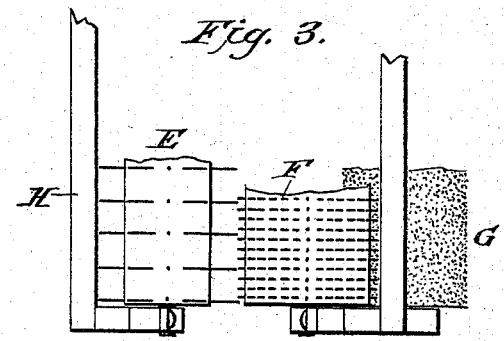
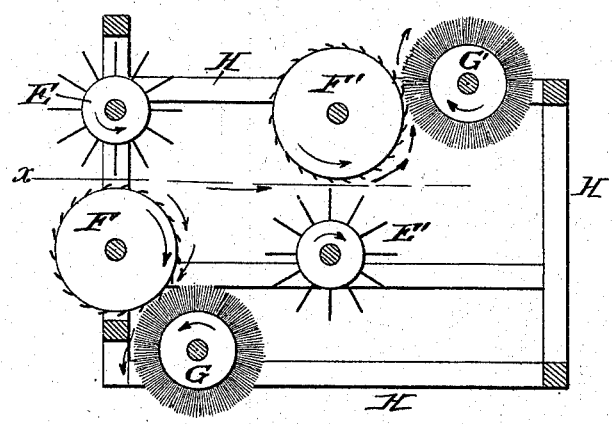
WITNESSES:
Fred G. Dieterich
Amos W. Hart
INVENTOR
George C. Phillips.
BY Munn & Co
ATTORNEYS.

UNITED STATES PATENT OFFICE.

GEORGE C. PHILLIPS, OF MANCHAC, LOUISIANA.

COTTON-PICKING MACHINE.

SPECIFICATION forming part of Letters Patent No. 530,451, dated December 4, 1894.

Application filed June 13, 1893. Serial No. 477,472. (No model.)

*To all whom it may concern:*

Be it known that I, GEORGE C. PHILLIPS, residing at Manchac, in the parish of East Baton Rouge and State of Louisiana, have invented a new and Improved Cotton-Picking Machine, of which the following is a specification.

My invention is an improvement in that class of cotton pickers in which the cotton is extracted from the bolls by means of toothed rotating rollers, or cylinders, arranged in a wheeled frame, or truck, in such a manner that they travel on both sides of a row of cotton plants and work in contact therewith. I have devised an improved construction and arrangement of toothed rollers, and mounted them in a swinging frame in rear of the truck, whereby they are adapted to move laterally as required to enable the picking rollers to work in contact with the cotton plants in the most efficient manner.

These and other related features of my invention are hereinafter fully described, reference being had to the accompanying drawings, in which—

Figure 1 is a side view of my machine. Fig. 2 is a top plan view of the same. Fig 2$^a$ is a detail. Fig. 3 is a front view of a portion of the picker proper, and Fig. 4 is a horizontal section of the picker proper.

The mechanism constituting the picker proper is mounted on a two-wheeled truck, whose axle A, is arched to adapt it to pass over a row of cotton plants, and whose transporting wheels B, are placed such distance apart as required to enable them to run between adjacent rows. The said truck is provided with a rigid guiding tongue C, and the driver's seat (not shown) is, in practice, placed on the front part of the frame D. The rear end of the latter is formed of two parallel cross-bars $a\ a'$, and to these the picking mechanism proper is attached.

The construction, arrangement, and operation of the latter are as follows: By referring particularly to Fig. 4, said mechanism will be seen to consist mainly of a long-toothed roller, or cylinder E, a larger and short-toothed cylinder F, and a brush, or brush cylinder G, arranged vertically parallel and adapted to rotate. The function of the roller E, is to push the opened cotton against the cylinder F, whose short teeth are curved or inclined in the direction of its rotation to enable them to take the cotton from the bolls. The cotton is then removed from the teeth by means of the brush G. It will be noted, that these three parts E, F, G, are duplicated, or in other words, that there are two sets of picking mechanism proper, one being arranged to pick the cotton from one side of a row of plants, and the other set to pick the cotton from the other side of the same. I have designated the parts of the second or rear set by the same letters primed, thus E', F' G'. The arrangement of the latter being similar to the others (E, F, G), save that they revolve in opposite directions, it is unnecessary to describe them further. Both sets are journaled in a rigid rectangular frame, H, composed of parallel top and bottom bars and parallel vertical bars, as shown. This frame, H, swings horizontally on the truck frame, D, being suspended from trussed, or braced, bars, I, which are pivoted on the rear bars, $a\ a'$, of the truck frame, and project rearwardly therefrom, as shown best in Fig. 1.

The details of the construction and arrangement of the attachment are as follows: Each of said bars, I, is pivoted on the upper end of a shaft or journal, J, fixed vertically in the truck-frame bars, $a$, $a'$, and is supported at its outer, or free, end by inclined brace, $b$, whose lower end is pivoted on said journal, J, at a point above the lower cross-bar $a$. The said bars, I, are thus adapted to swing laterally, and the picker frame swings with them, being suspended from them by means of journal-rods, K, which have a fixed attachment to the front upper portion of said frame, H, being journaled and supported in boxes fitted in the free ends of such swinging bars, I. The journal-rods, K, extend above the bars, I, and braces support their upper ends as shown. A combined tension and brace rod also extends from the upper end of each journal-rod, K, to the swing frame, H. By this arrangement of parts, the latter is supported in horizontal position, and yet adapted to move laterally to enable it to follow the sinuosities and conform to irregularities in the row of plants, which passes between the two sets of picking mechanism. The median course between the two sets is indicated by arrows, x.

It will be understood, that the frame, H, is mainly guided by contact with the row of cotton plants; but, in practice, it is provided with handles on its rear side, so that a man following the machine may, by seizing them, easily sway and guide the frame, H, laterally, as required by the irregular line of the row. It will be further observed, that the frame, H, preserves its parallelism to the truck frame, whatever be its lateral deviation.

I will now describe some details of construction and operation of the rollers. The teeth or pins of the smallest roller, E, are blunted, (see Fig. 2$^a$) and about one and one-half inches long, and set about two (2) inches (more or less) apart in any direction. The open bolls being much larger than the unopen ones, are pushed by such teeth against the picking cylinder, F, whose short and curved or inclined needle-like teeth then catch into and extract the cotton; but the smaller and harder unopened bolls and the leaves and branches of the plants are for the most part crowded into the spaces between the teeth of rollers, E, as it rotates. In other words, the open spaces between the pins of roller, E, provide receptacles, so to speak, for the unopened bolls, the leaves and branches, so that the sharp and more thickly-set teeth of the picking cylinder, F, do not catch on them, or to but a very slight extent.

The cotton adhering to the teeth of cylinder, F, is removed by the brush, G, and deposited in a suitable receptacle. (Not shown.)

In order that the above operation of parts E, F, G, may be effective, I provide gearing which is so arranged that the face of the picking-cylinder, F, next the row of cotton rotates backward about one eighth faster, and the ends of the pins of roller, E, about one eighth slower than the truck moves forward, while the brush, G, rotates three times faster than cylinder, F.

The gearing by which the above described differential rotation is imparted to the several rollers, is arranged as follows: A sprocket wheel $d$ is fixed to the inner side of each of the truck wheels, B, and a chain $e$ runs from that to a smaller sprocket wheel mounted on a shaft $f$, arranged transversely above and parallel to the frame bar, $a$. The inner end of said shafts carries a pinion, which engages a geared circle on the under side of a sprocket wheel, $g$, which is mounted on a vertical shaft, $h$, fixed rigidly in bars, $a$ $a'$.

Rotation is imparted to the two sets (E, F, G, and E′ F′, G′) of picker mechanism by means of endless chains $i$ and $j$, and gearing, $k$, as shown in Fig. 2.

Having thus described my invention, what I claim is—

1. In a cotton picking machine, the combination, with a vertical rotary picking-cylinder armed with curved or inclined and thickly set, teeth, of a second roller, or cylinder, arranged parallel to and near the first to work on the opposite side of the row of plants, and having blunted teeth or pins set a comparatively wide distance apart, as shown and described, whereby the cotton of the opened bolls is pushed against the said picking cylinder and the unopened bolls &c. are received into the spaces between the teeth of the other cylinder, as specified.

2. In a cotton picking machine, the combination, with the picking-cylinder, F, armed with short, sharp, curved and thickly set, teeth, of a smaller cylinder, E, arranged parallel and contiguous to the former, and having radial teeth which are blunt-pointed and set about two inches more or less apart, the picking cylinder being geared as specified whereby it rotates about one eighth faster, and the other rotates that much slower than the machine advances, as specified.

3. In a cotton picking machine, the combination, with the truck and frame attached to and supporting the picking mechanism comprising the roller, E, having blunt pointed teeth or pins, set widely apart, the contiguous and parallel picking cylinder, F, having short, sharp, and curved teeth, and the parallel and contiguous brush cylinder, G, and the sprocket wheels, chains, shafts and toothed gears, all arranged in connection with the aforesaid rotary parts, E, F, G, whereby they are rotated at the relative speeds specified.

4. In a cotton picking machine, the combination, with the truck, of swinging bars pivoted and supported thereon horizontally and the frame carrying the picking mechanism, which frame is suspended from and adapted to swing with said bars, but always parallel with the row of cotton substantially as shown and described.

5. In a cotton picking machine, the combination, with the truck, and two parallel, pivoted swinging bars which project rearwardly therefrom, horizontally, of a frame which is attached to rods journaled in the free ends of said bars, and two sets of picking mechanism, each composed of rotary toothed rollers and a brush, one set being arranged in rear of the other, and adapted to work on the opposite side of a cotton row, as specified.

GEORGE C. PHILLIPS.

Witnesses:
EDWARD D. MULLEN,
LEROY STAFFORD.